United States Patent
Yamada

(10) Patent No.: US 9,789,817 B2
(45) Date of Patent: Oct. 17, 2017

(54) WARNING CONTROL APPARATUS

(71) Applicant: DENSO CORPORATION, Kariya, Aichi-pref. (JP)

(72) Inventor: Yukihiko Yamada, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/163,545

(22) Filed: May 24, 2016

(65) Prior Publication Data

US 2016/0347249 A1    Dec. 1, 2016

(30) Foreign Application Priority Data

May 28, 2015    (JP) .................. 2015-108793

(51) Int. Cl.
  *B60Q 1/00*    (2006.01)
  *B60Q 9/00*    (2006.01)
(52) U.S. Cl.
  CPC .................... *B60Q 9/008* (2013.01)
(58) Field of Classification Search
  CPC .. G01S 11/08; G01S 7/40; G04G 7/02; G04R 40/06; B60W 2550/10; B60W 30/095; B60W 30/08; B60W 30/09; B60W 2520/10; B60W 2520/125; B60W 2540/18; B60W 2540/30; B60W 2710/207; B60W 2050/0089
  USPC ....... 340/435, 436, 438–439, 444, 463, 466, 340/467, 477, 539.1, 539.19, 5.63, 309.16
  See application file for complete search history.

(56) References Cited

U.S. PATENT DOCUMENTS

| 7,937,199 B2 * | 5/2011 | Shoda ..................... G08G 1/163 701/301 |
| 2014/0236386 A1 * | 8/2014 | Yoshizawa ............ B60W 30/08 701/1 |
| 2014/0240115 A1 * | 8/2014 | Igarashi ................ B60W 30/08 340/435 |
| 2015/0234044 A1 * | 8/2015 | Ouchi ..................... G01S 13/08 342/27 |

FOREIGN PATENT DOCUMENTS

JP    2009-173222 A    8/2009

* cited by examiner

*Primary Examiner* — Daniel Previl
(74) *Attorney, Agent, or Firm* — Knobbe, Martens, Olson & Bear, LLP

(57) ABSTRACT

A warning control apparatus includes a learning section that learns a collision avoidance timing at which a driver of an own vehicle starts to perform an operation for avoiding collision with a front object based on a distance to this object and a speed of the own vehicle, a threshold setting section that determines whether the driver tends to start a collision avoidance operation early or late based on the learned collision avoidance timing, sets an avoidance warning threshold larger than a basic threshold upon determining that the vehicle driver tends to start the collision avoidance operation early, and sets the avoidance warning threshold smaller than the basic threshold in the contrary case, and a warning control section that causes a warning device to issue a warning at a warning timing set so as to become early as the avoidance warning threshold set by the threshold setting section becomes large.

5 Claims, 6 Drawing Sheets

WARNING CONTROL APPARATUS

This application claims priority to Japanese Patent Application No. 2015-108793 filed on May 28, 2015, the entire contents of which are hereby incorporated by reference.

BACKGROUND OF THE INVENTION

1. Field of the Invention

The present invention relates to a warning control apparatus for controlling warning to a vehicle driver.

2. Description of Related Art

There is known a system that issues a warning to a driver of a vehicle upon detecting a possibility of collision of the vehicle, to avoid the collision. For example, refer to Japanese Patent Application Laid-open No. 2009-173222. The system described in this patent document is configured to issue a warning at a timing determined based on driver information (age, driving experience and so on, for example) of an identified driver of a vehicle and the current driving state of the vehicle (the vehicle speed and following distance, for example).

In such a system, if the timing at which a warning to avoid collision is given to a vehicle driver does not match the sensitivity or preference of the vehicle driver, the vehicle driver may feel unnatural or uncomfortable. Vehicle drivers have different habits and likings in driving a vehicle, which are irrelevant to their ages and driving experiences. Accordingly, if the timing to give a warning to a vehicle driver is determined based on the age or driving experience of the vehicle driver in a single uniform way, the vehicle driver may feel that something unnatural or uncomfortable is occurring.

SUMMARY

An exemplary embodiment provides a warning control apparatus including:

a distance information acquisition section that acquires front-object distance information showing a front object distance as a distance from an own vehicle to a front object present in front of the own vehicle;

a vehicle speed acquisition section that acquires vehicle speed information showing a running speed of the own vehicle;

a learning section that learns a collision avoidance timing at which a vehicle driver of the own vehicle starts to perform an operation for avoiding a collision with the front object at least based on the front object distance shown by the front-object distance information and the running speed of the own vehicle shown by the vehicle speed information;

a threshold setting section that determines whether the vehicle driver tends to start a collision avoidance operation early or late based on the learned collision avoidance timing, sets an avoidance warning threshold larger than a predetermined basic threshold upon determining that the vehicle driver tends to start the collision avoidance operation early, and sets the avoidance warning threshold smaller than the predetermined basic threshold upon determining that the vehicle driver tends to start the collision avoidance operation late; and a warning control section that causes a warning device to issue a warning for preventing a collision at a warning timing set so as to become earlier as the avoidance warning threshold set by the threshold setting section becomes larger.

According to the exemplary embodiment, there is provided a warning control apparatus capable of controlling a warning device to issue a warning for collision prevention at a timing not causing a vehicle driver to feel unnatural or uncomfortable.

Other advantages and features of the invention will become apparent from the following description including the drawings and claims.

PREFERRED EMBODIMENTS OF THE INVENTION

Figure 1:
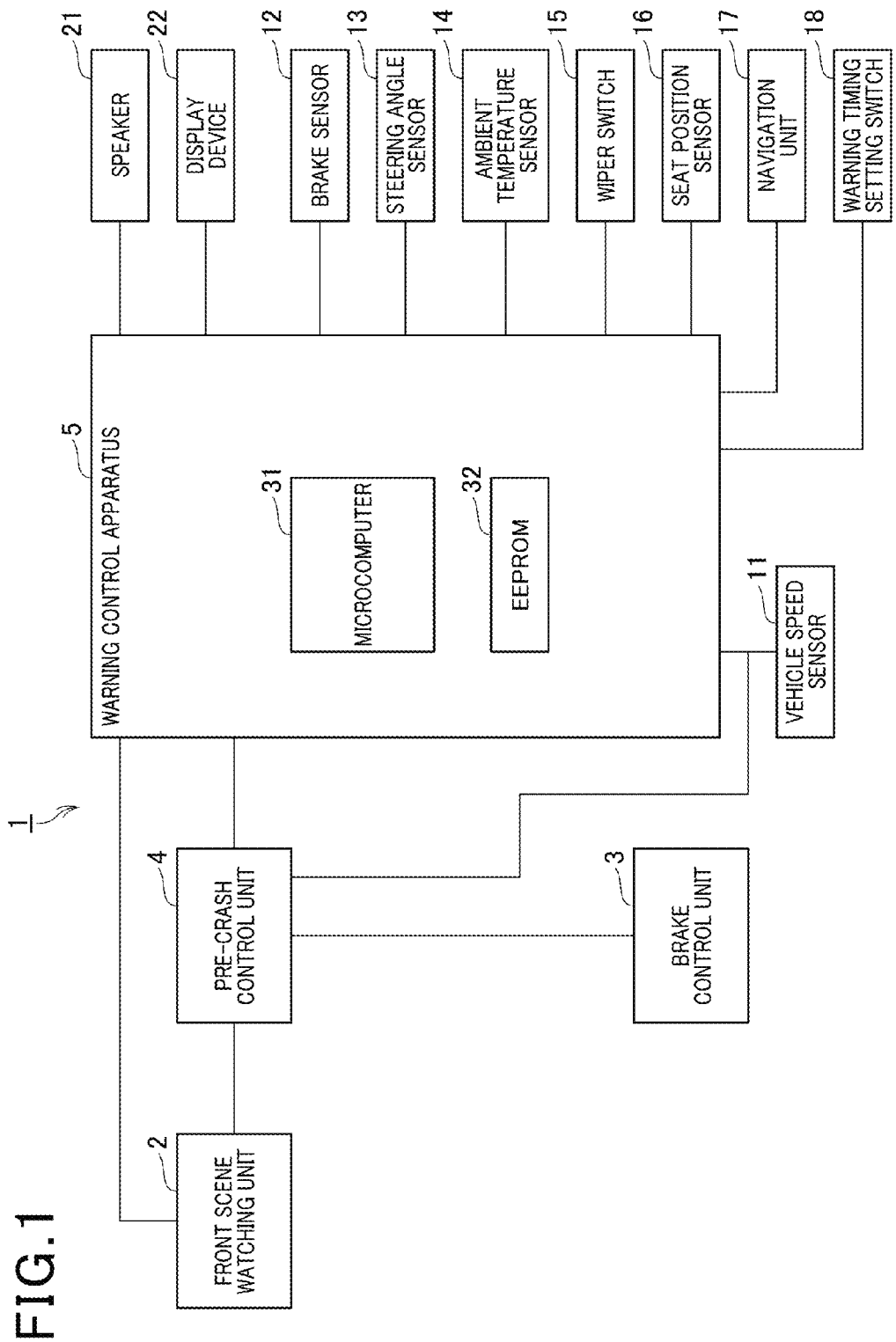
FIG. 1 is a block diagram showing the structure of a pre-crash safety system including a warning control unit according to an embodiment of the invention.

FIG. 1 is a block diagram showing the structure of a pre-crash safety system 1 including a warning control unit 5 according to an embodiment of the invention. As shown in FIG. 1, the pre-crash safety system 1 includes a front scene watching unit 2, a brake control unit 3, a pre-crash control unit 4 and the warning control unit 5. In the following, a vehicle on which the pre-crash safety system 1 is mounted is referred to as the own vehicle.

The front scene watching unit 2 detects a distance to an object present in front of the own vehicle by emitting radar waves forward of the own vehicle and receiving a reflected version of the radar waves. The front scene watching unit 2 outputs a front-object distance information showing the distance to the object.

The brake control unit 3 controls a braking force of the own vehicle by driving a brake actuator (not shown) in accordance with a required deceleration command (explained later) sent from the pre-crash control unit 4.

The pre-crash control unit 4 calculates TTC (Time To Collision) based on the front-object distance information sent from the front scene watching unit 2, the vehicle speed signal outputted from a vehicle speed sensor 11 which detects the speed of the own vehicle and so on. If the calculated TTC is smaller than a predetermined brake control determination value, the pre-crash control unit 4 sends the required deceleration command with a deceleration set depending on the TTC to the brake control unit 3 to increase the braking force of the own vehicle.

The warning control unit 5 includes a microcomputer 31 and an EEPROM 32. The microcomputer 31, which includes a CPU, a ROM, a RAM, an I/O and a bus line connecting these components, performs various processes by executing programs stored in the ROM.

The warning control unit 5 is connected with the vehicle speed sensor 11, a brake sensor 12, a steering angle sensor 13, an ambient temperature sensor 14, a wiper switch 15, a seat position sensor 16, a navigation unit 17 and a warning timing setting switch 18.

The brake sensor 12 detects a brake depression amount (an amount of depression of the brake pedal by a braking operation of the vehicle driver). The steering angle sensor 13 detects a steering angle of the front wheels of the own vehicle by a steering operation of the vehicle driver. The ambient temperature sensor 14 detects the ambient temperature of the own vehicle. The wiper switch 15, which is operated by the vehicle driver to drive the wiper, outputs a wiper set-position signal showing the switch position thereof.

The seat position sensor 16 detects the position of the driver's seat whose seat position can be set differently for different vehicle drivers. The navigation unit 17 acquires road map data from a map storage medium, detects the current position of the own vehicle based on GPS signals received by a GPS antenna and so on, and performs a route guide from the current position to a destination. The road map data includes road positions, road types, road shapes, road widths, road names, the number of lanes, road grades and so on.

The warning timing setting switch 18 is set to one of "early timing position" to issue a warning at an early timing, "normal timing position" to issue a warning at a normal timing and "late timing position" to issue a warning at a late timing. The warning timing setting switch 18 outputs a timing set-position signal showing the set position thereof.

Figure 2:
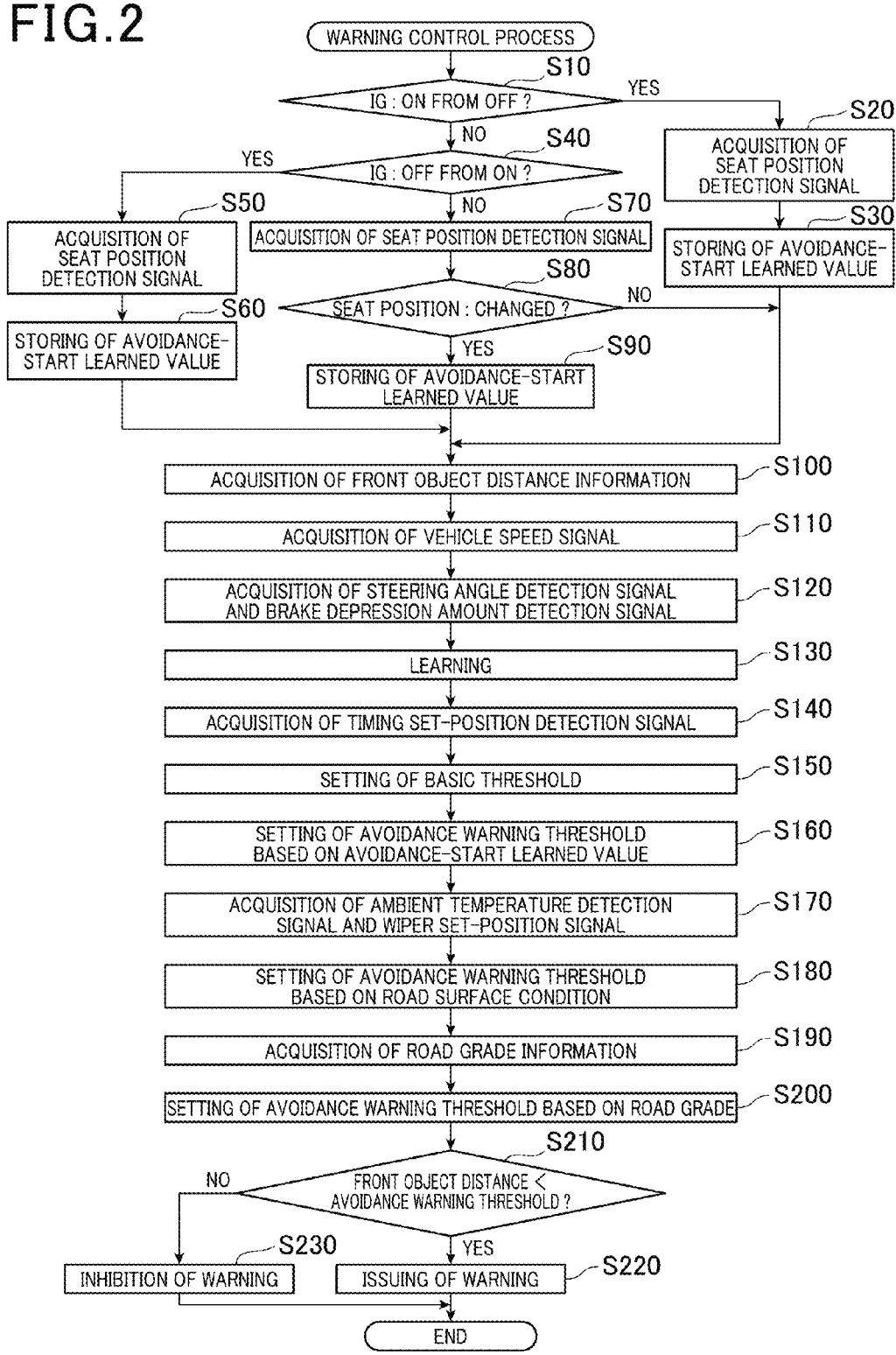
FIG. 2 is a flowchart showing steps of a warning control process performed by the warning control unit.

The warning control unit 5 controls a speaker 21 and a display device 22 installed in the cabin of the own vehicle. The CPU of the warning control unit 5 performs a warning control process shown in FIG. 2 repeatedly while the warning control unit 5 is in operation.

This warning control process begins in step S10 where the microcomputer 31 of the warning control unit 5 determines whether or not the ignition switch has been changed from on to off. If the determination result in step S10 is affirmative, the process proceeds to step S20 where a seat position detection signal is acquired from the seat position sensor 16. In subsequent step S30, an avoidance-start learned value and the number of times of the learning corresponding to the seat position shown by the seat position signal are acquired from the EEPROM 32, and are stored in a learning memory area in the RAM of the microcomputer 31. Then, the process proceeds to step S100. The EEPROM 32 has a learned value storing area for storing therein the avoidance-start learned value and the number of times of the learning for each seat position. In step S30, the avoidance-start learned value and the number of times of the learning are acquired by reading the learned value storing area corresponding to the seat position shown by the seat position detection signal.

On the other hand, if the determination result in step S10 is negative, the process proceeds to step S40 where it is determined whether or not the ignition switch has been changed from on to off. If the determination result in step S40 is affirmative, the process proceeds to step S50 where the seat position signal is acquired from the seat position sensor 16. In subsequent step S60, the avoidance-start learned value and the number of times of the learning are updated by overwriting the avoidance-start learned value and the number of times of the learning stored in the learning memory area of the RAM of the microcomputer 31 into the learned value storing area corresponding to the seat position shown by the seat position detection signal.

On the other hand, if the determination result in step S40 is negative, the process proceeds to step S70 where the seat position detection signal is acquired from the seat position sensor. In subsequent step S80, it is determined whether or not the seat position has been changed based on the seat position detection signal acquired in the last warning control process and the seat position detection signal acquired in the current warning control process.

If the determination result in step S80 is negative, the process proceeds to step S100. On the other hand, if the determination result in step S80 is affirmative, the process proceeds to step S90 where the avoidance-start learned value and the number of times of the learning corresponding to the seat position shown by the seat position detection signal are acquired from the EEPROM 32, and the acquired the avoidance-start learned value and the number of times of the learning are overwritten into the learning memory area of the RAM of the microcomputer 31. Thereafter, the process proceeds to step S100.

In step S100, the front-object distance information is acquired from the front scene watching unit 2. In subsequent step S110, the vehicle speed signal is acquired from the vehicle speed sensor 11. Further, in subsequent step S120, the steering angle detection signal and the brake depression amount signal are acquired from the steering angle sensor 13 and the brake sensor 12, respectively.

Then, in step S130, the avoidance-start learned value is learned. Specifically, there is calculated the TTC at a moment when the brake pedal starts to be operated while a predetermined learning execution condition holds. Next, a weighted average of the calculated TTC and the avoidance-start learned value stored in the learning memory area is calculated as an updated avoidance-start learned value. More specifically, when the number of times of the learning stored in the learning memory area is N, the sum of the product of the TTC and $\{1/(N+1)\}$ and the product of the avoidance-start learned value stored in the learning memory area and $\{N/(N+1)\}$ is calculated.

The learning execution condition is satisfied, for example, if an object is present in front of the own vehicle, the speed of the own vehicle is larger than a predetermined learning start speed (40 km/h, for example), and the steering angle is within a predetermined normal running range (between −5 degrees and +5 degrees, for example). The avoidance-start learned value is updated by rewriting the avoidance-start learned value stored in the learning memory area of the RAM of the microcomputer 31 with the currently calculated avoidance-start learned value. Further, in step S100, one is added to the number of times of the learning stored in the learning memory area of the RAM of the microcomputer 31, and the number of times of the learning is updated by overwriting this sum into the learning memory area.

Subsequently, the timing set-position signal is acquired from the warning timing setting switch 18 in step S140. In subsequent step S150, a basic threshold is set in accordance with the timing set-position signal and the vehicle speed detection signal. Specifically, one of a threshold setting map for early timing, a threshold setting map for normal timing and a threshold setting map for late timing is selected in accordance with the set position shown by the timing set-position signal acquired in step S140. When the timing set-position signal shows the early timing position, the threshold setting map for early timing is selected. When the timing set-position signal shows the normal timing position, the threshold setting map for normal timing is selected. When the timing set-position signal shows the late timing position, the threshold setting map for late timing is selected. The threshold setting map for early timing shows a relationship between the vehicle speed and the basic threshold to issue a warning at an early timing. The threshold setting map for normal timing shows a relationship between the vehicle speed and the basic threshold to issue a warning at a normal timing. The threshold setting map for late timing shows a relationship between the vehicle speed and the basic threshold to issue a warning at a late timing. In these maps, the basic threshold is positively correlated with the vehicle speed. For the same vehicle speed, the basic threshold of the map for late timing is the smallest, the basic threshold of the map for early timing is the largest, and the basic threshold of the map for normal timing is therebetween.

Thereafter, in step S150, the basic threshold is set in accordance with the vehicle speed acquired in step S110 by referring to the selected threshold setting map. In subsequent step S160, an avoidance warning threshold is set in accordance with the avoidance-start learned value stored in the learning memory area of the RAM of the microcomputer 31. Specifically, the avoidance-start learned value stored in the learning memory area is compared with a predetermined normal avoidance determination value.

Figure 3:
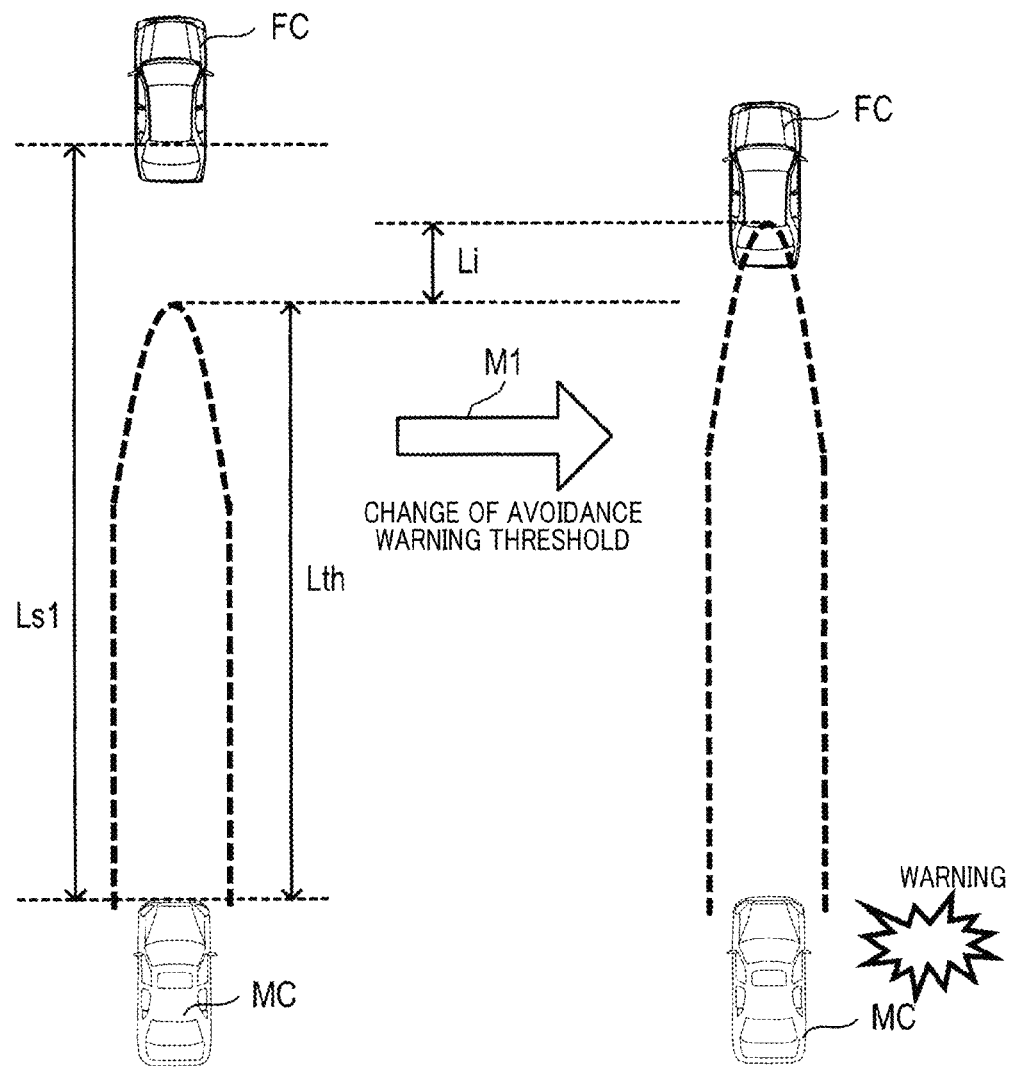
FIG. 3 is a diagram for explaining a procedure for setting an avoidance warning threshold when a timing of starting a collision avoidance operation is early.

When the avoidance-start learned value is larger than the normal avoidance determination value, the avoidance warning threshold is set larger than the base threshold set in step S150 (see the basic threshold Lth shown in FIG. 3) assuming that the vehicle driver tends to start a collision avoidance operation early.

Specifically, the sum of an increase threshold set depending on the difference between the avoidance-start learned value and the normal avoidance determination value (see the increase threshold Li shown in FIG. 3) and the basic threshold is set as the avoidance warning threshold.

For example, when the distance between the own vehicle MC and a preceding vehicle FC at which an operation to avoid collision therebetween is started is long (see the distance Ls1 in FIG. 3), and the avoidance warning threshold is larger than the basic threshold (see the arrow M1 in FIG. 3), the warning timing is changed so that a warning is issued early.

On the other hand, when the avoidance-start learned value is smaller than the normal avoidance determination value, the avoidance warning threshold is set smaller than the basic threshold set in step S150 (see the basic threshold Lth in FIG. 4), assuming that the vehicle driver tends to start a collision avoidance operation late. Specifically, the basic threshold minus a reduction threshold set depending on the difference between the avoidance-start learned value and the normal avoidance determination value (see the reduction threshold Ld in FIG. 4) is set as the avoidance warning threshold.

Figure 4:
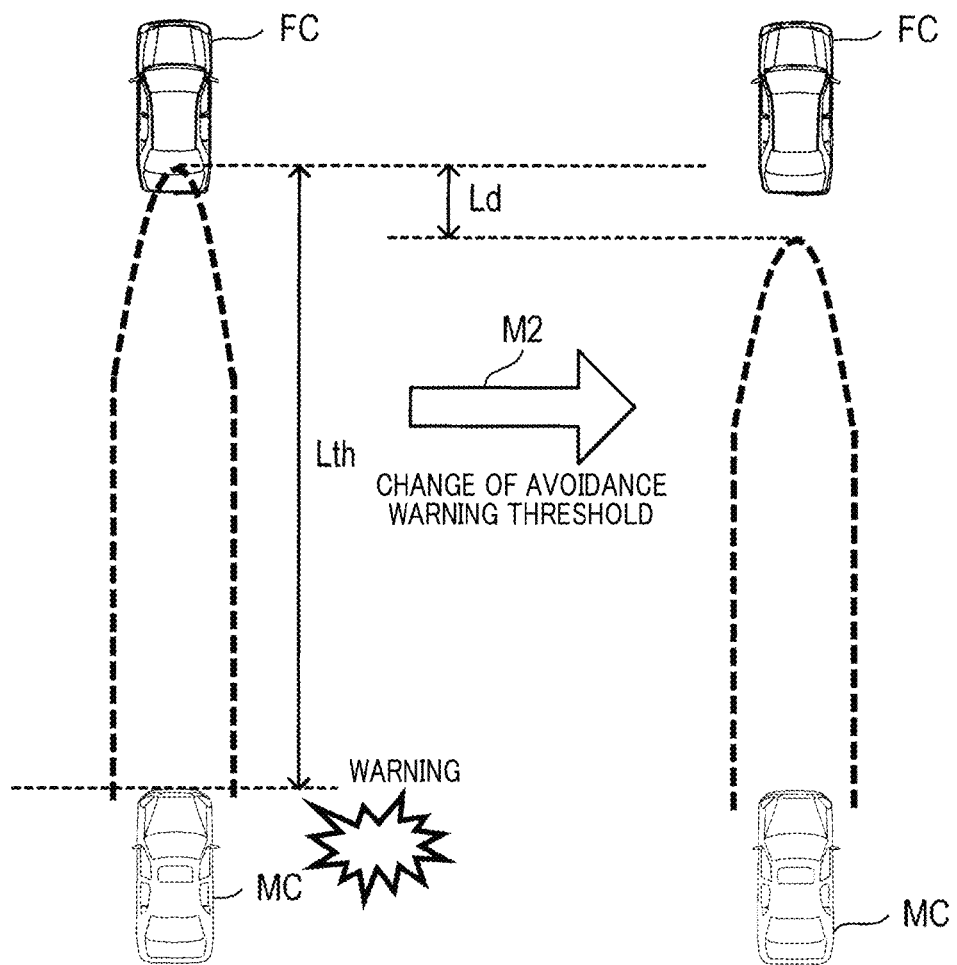
FIG. 4 is a diagram for explaining a procedure for setting the avoidance warning threshold when the timing of starting the collision avoidance operation is late.

As a result, as shown in FIG. 4, the avoidance warning threshold becomes smaller than the basic threshold Lth (see the arrow M2 in FIG. 4), and the warning timing is changed so that a warning is issued late. If the avoidance-start learned value coincides with the normal avoidance determination value, the basic threshold set in step S150 is set as the avoidance warning threshold.

Figure 5:
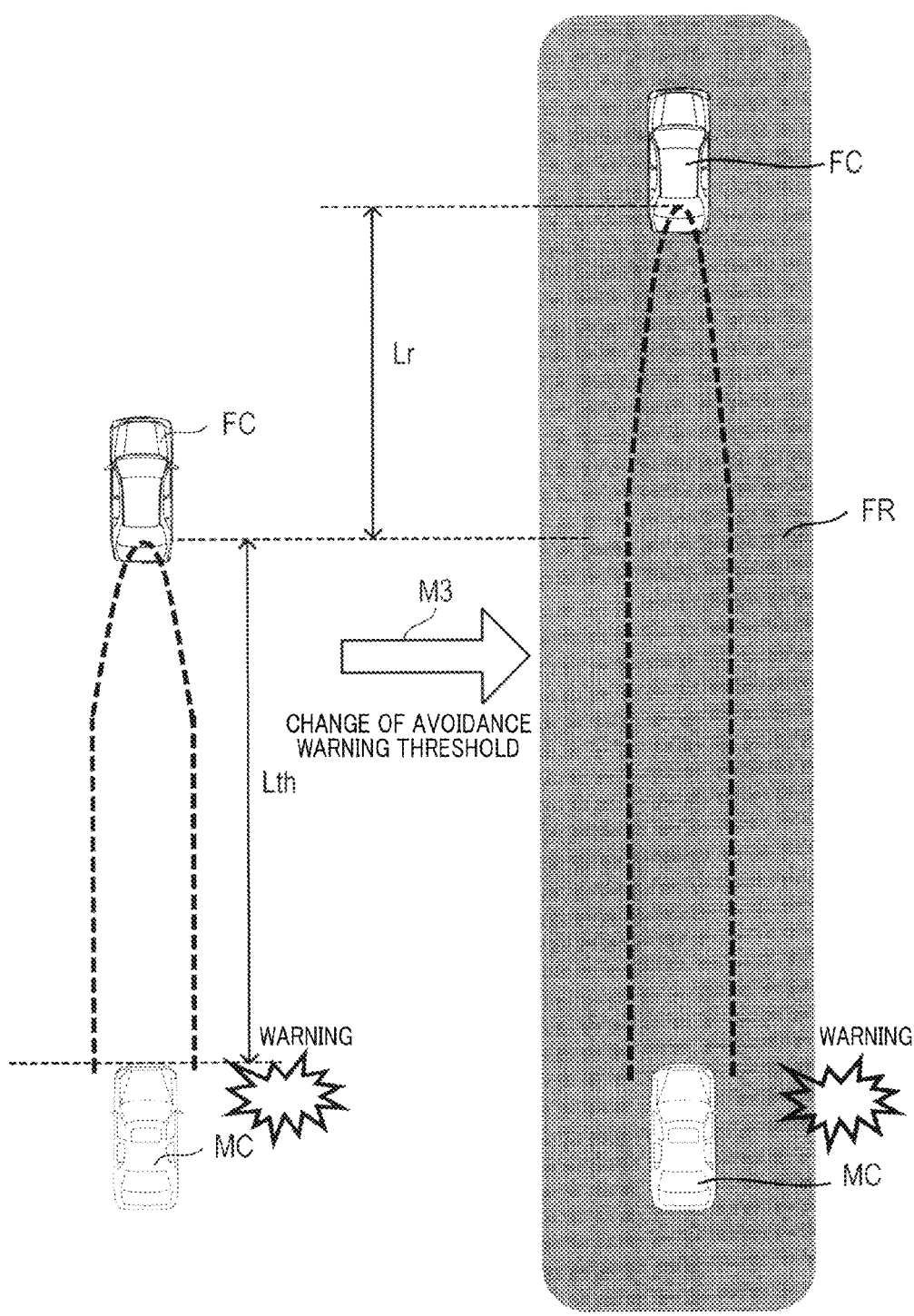
FIG. 5 is a diagram for explaining a procedure for setting the avoidance warning threshold depending on a road surface condition.

After completion of step S160, the ambient temperature detection signal is acquired from the ambient temperature sensor 14 and the wiper set-position signal is acquired from the wiper switch 15 in steps S170. In subsequent step S180, the avoidance warning threshold is set depending on the road surface condition. Specifically, it is determined whether the road surface condition is any one of "rain", "snow" and "frozen" based on the ambient temperature shown by the ambient temperature detection signal and the wiper set-position shown by the wiper set-position signal. If the determination result in step S180 is negative, the avoidance warning threshold set in step S160 is remained unchanged. If the determination result in step S180 is affirmative, one of a rain increase threshold, a snow increase threshold and a freeze increase threshold selected in accordance with the road surface condition (see the increase threshold Lr in FIG. 5) is added to the avoidance warning threshold set in step S160, and this sum is set as the avoidance warning threshold.

For example, when the own vehicle is running on a frozen road FR, since the avoidance warning threshold becomes larger than the basic threshold Lth (see the arrow M3 in FIG. 5), the warning timing is changed so that a warning is issued early.

Figure 6:
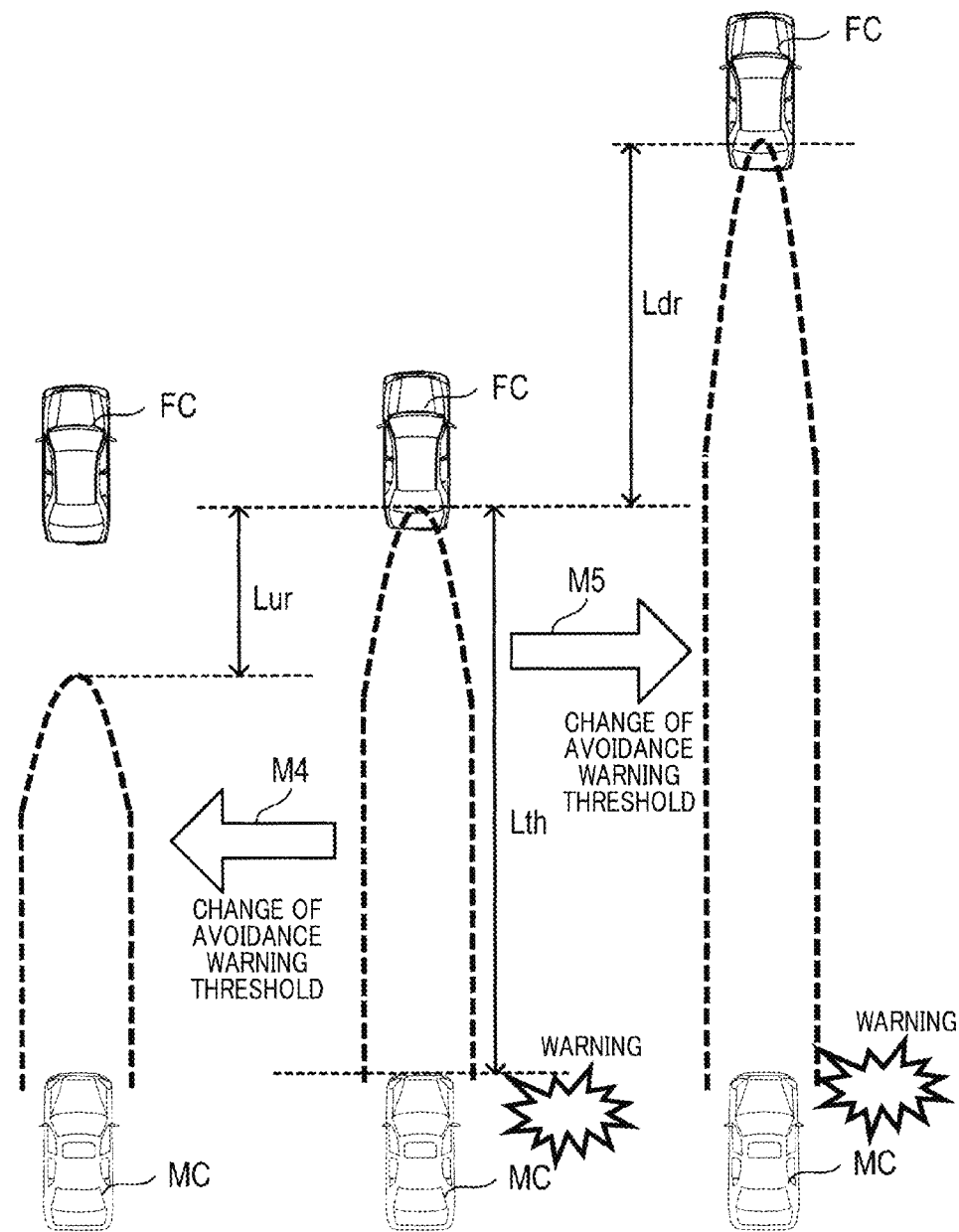
FIG. 6 is a diagram for explaining a procedure for setting the avoidance warning threshold depending on a road grade.

After completion of step S180, the process proceeds to step S190 where the road grade information is acquired from the navigation unit 17. In subsequent step S200, the avoidance warning threshold is set depending on the road grade. Specifically, it is determined whether the road is flat, uphill or downhill based on the road grade information. If the road is determined to be flat, step S200 is ended without changing the avoidance warning threshold set in step S180. If the road is determined to be uphill, a predetermined reduction threshold (see the reduction threshold Lur in FIG. 6) is subtracted from the avoidance warning threshold set in step S180, and the remainder is set as the avoidance warning threshold.

For example, when the own vehicle is running on an uphill road, since the avoidance warning threshold becomes smaller than the basic threshold Lth (see the arrow M4 in FIG. 6), the warning timing is changed so that a warning is issued late.

If the road is determined to be downhill, a predetermined increase threshold (see the increase threshold Ldr in FIG. 6) is added to the avoidance warning threshold set in step S180, and the sum is set as the avoidance warning threshold.

For example, when the own vehicle is running on a downhill road, since the avoidance warning threshold becomes larger than the basic threshold Lth (see the arrow M5 in FIG. 6), the warning timing is changed so that a warning is issued early.

After completion of step S200, the process proceeds to step S210 where it is determined whether or not the front object distance shown by the front-object distance information is smaller than the avoidance warning threshold set in step S200. If the determination result in step S210 is affirmative, the process proceeds to step S220 to cause the speaker 21 to emit a warning sound, and cause the display device 22 to display a warning image to warn the vehicle driver. Then, this process is terminated.

On the other hand, if the determination result in step S210 is negative, the process proceeds to step S230 to inhibit issuing a warning from the speaker 21 and the display device 22. Then, this process is terminated. Specifically, when the speaker 21 is emitting a warning sound, the speaker 21 is caused to stop the operation, and when the display device 22 is displaying a warning image, the display device 22 is caused to stop the operation. When they are not operating, step 230 is ended without performing any operation.

The warning control unit 5 having the structure described above acquires the front-object distance information (step S100) from the front scene watching unit 2, and acquires the vehicle speed detection signal (step S110) from the vehicle speed sensor 11. The warning control unit 5 learns, as the avoidance-start learned value, the TTC at the moment when the brake pedal starts to be operated by the vehicle driver to avoid collision with the front object based on at least the front object distance shown by the front-object distance information and the vehicle speed shown by the vehicle speed detection signal (steps S10 to 90, S120 and S130).

The warning control unit 5 determines whether the vehicle driver tends to start a collision avoidance operation early or late based on the learned avoidance-start learned value (step S160). The warning control unit 5 sets the avoidance warning threshold larger than the basic threshold when it determines that the vehicle driver tends to start a collision avoidance operation early, and sets the avoidance warning threshold smaller than the basic threshold when it determines that the vehicle driver tends to start a collision avoidance operation late (step S160).

The warning control unit 5 causes the speaker 21 to emit a warning sound, and causes the display device 22 to display a warning image (steps S210, 220).

As described above, the warning control unit 5 learns, as a collision avoidance timing, a timing at which the vehicle operator starts to operate the brake pedal. Therefore, the warning control unit 5 can acquire information about the vehicle driver as to whether the vehicle driver tends to start a collision avoidance operation early or late.

In the case where the vehicle driver tends to start a collision avoidance operation early, the warning control unit 5 sets the avoidance warning threshold large compared to the case where the vehicle driver tends to start a collision avoidance operation late.

The warning control unit 5 causes the speaker 21 and the display device 22 to operate when the front object distance is smaller than the avoidance warning threshold. Accordingly, the warning control unit 5 can give a warning to the vehicle driver early if the vehicle driver tends to or likes to start a collision avoidance operation early. On the other hand, the warning control unit 5 can give a warning to the vehicle driver late if the vehicle driver tends to or likes to start a collision avoidance operation late.

As explained above, since the warning control unit 5 can issue a warning at a timing conforming to the vehicle driver's tendency or liking, it is possible to prevent the vehicle driver from feeling unnatural or uncomfortable.

The warning control unit 5 corrects the avoidance warning threshold depending on the surface condition of the road on which the own vehicle is running (steps S170, S180). Accordingly, when the road surface is slippery, the warning control unit 5 can issue a warning at an early timing to encourage the vehicle driver to start a collision avoidance operation early.

The warning control unit 5 corrects the avoidance warning threshold in accordance with the grade of the road on which the own vehicle is running (steps S190, S200). Accordingly, the warning control unit 5 can issue a warning at a late timing to encourage the vehicle driver to start a collision avoidance operation at a late timing when the own vehicle is running on an uphill road. This makes it possible to prevent the vehicle driver from performing a collision avoidance operation unnecessarily when the own vehicle is running on an uphill road. On the other hand, the warning control unit 5 can issue a warning at an early timing to encourage the vehicle driver to start a collision avoidance operation at an early timing when the own vehicle is running on a downhill road.

The warning control unit 5 acquires the seat position signal showing the seat position of the driver's seat of the own vehicle (steps S20, S50, S70). The warning control unit 5 learns the avoidance-start learned value for each seat position shown by the seat position signal (steps S10, S30, S40, S60, S80 to S130).

Accordingly, the warning control unit 5 can identify the vehicle driver based on the detected seat position in a case where the own vehicle is used by a plurality of persons, and learn the avoidance-start learned value for each of the persons. Therefore, it is possible to issue a warning at a timing appropriate to each of the persons.

In the above described embodiment, step S100 corresponds to a distance information acquisition section, step S110 corresponds to a vehicle speed acquisition section, steps S10 to S90, S120 and S130 correspond to learning section, step S160 corresponds to a threshold setting section, steps S210 and S220 correspond to warning control section, and the speaker 21 and the display device 22 correspond to a warning device.

Steps S170 and S180 correspond to a first correction section, steps S190 and S200 correspond to a second correction section, and steps S20, S50 and S70 correspond to a seat position information acquisition section.

It is a matter of course that various modifications can be made to the above described embodiment as described below.

Modification 1:

In the above embodiment, the avoidance-start learned value is calculated based on the timing at which the brake pedal starts to be operated. However, the avoidance-start learned value may be calculated based on the timing at which a steering operation starts to be performed.

Modification 2:

In the above embodiment, the road surface condition is determined using the ambient temperature sensor 14 and the wiper switch 15. However, when a running mode switch is provided in the own vehicle, the above embodiment may be modified such that the road surface condition is determined to be in a snow mode, a sand mode or a mud mode based on the switch position of the running mode switch.

Modification 3:

In the above embodiment, the road grade is determined based on the road grade information. However, the road grade may be determined using an acceleration sensor mounted on the own vehicle. When the own vehicle is provided with a running mode selector for switching between an uphill running mode and a downhill running mode, the running mode switch may be used for determining whether the own vehicle is running on an uphill road or a downhill road.

Modification 4:

In the above embodiment, the avoidance-start learned value is changed by acquiring the avoidance-start learned value corresponding to the seat position from EEPROM 32 and overwriting it into the learning memory area of the RAM of the microcomputer 31 (step S90) when the seat position is changed (step S80: YES). However, in a case where the avoidance-start learned value is not learned differently for each seat position, the avoidance-start learned value may be reset to a predetermined initial value when the seat position is changed. This makes it possible to prevent occurrence of a situation that a warning is issued based on the avoidance-start learned value corresponding to the previous vehicle driver when the vehicle driver is changed.

The above explained preferred embodiments are exemplary of the invention of the present application which is described solely by the claims appended below. It should be understood that modifications of the preferred embodiments may be made as would occur to one of skill in the art.

What is claimed is:

1. A warning control apparatus comprising:
   a distance information acquisition section that acquires front-object distance information showing a front object distance as a distance from an own vehicle to a front object present in front of the own vehicle;

a vehicle speed acquisition section that acquires vehicle speed information showing a running speed of the own vehicle;

a learning section that learns a collision avoidance timing at which a vehicle driver of the own vehicle starts to perform an operation for avoiding a collision with the front object at least based on the front object distance shown by the front-object distance information and the running speed of the own vehicle shown by the vehicle speed information;

a threshold setting section that determines whether the vehicle driver tends to start a collision avoidance operation early or late based on the learned collision avoidance timing, sets an avoidance warning threshold larger than a predetermined basic threshold upon determining that the vehicle driver tends to start the collision avoidance operation early, and sets the avoidance warning threshold smaller than the predetermined basic threshold upon determining that the vehicle driver tends to start the collision avoidance operation late; and a warning control section that causes a warning device to issue a warning for preventing a collision at a warning timing set so as to become earlier as the avoidance warning threshold set by the threshold setting section becomes larger.

2. The warning control apparatus according to claim 1, further comprising a correction section that corrects the avoidance warning threshold in accordance with a surface condition of a road on which the own vehicle is running.

3. The warning control apparatus according to claim 1, further comprising a correction section that corrects the avoidance warning threshold in accordance with a grade of a road on which the own vehicle is running.

4. The warning control apparatus according to claim 1, further comprising a seat position information acquisition section that acquires seat position information showing a seat position of a driver's seat of the own vehicle, the learning section being configured to learn the collision avoidance timing for each seat position shown by the seat position information.

5. The warning control apparatus according to claim 1, further comprising a seat position information acquisition section that acquires seat position information showing a seat position of a driver's seat of the own vehicle, the learning section being configured to reset the collision avoidance timing when the seat position information shows that the seat position has been changed.

* * * * *